May 15, 1956 R. N. WINFREE 2,745,627
MANUAL AND AUTOMATIC VALVES
Original Filed May 31, 1950
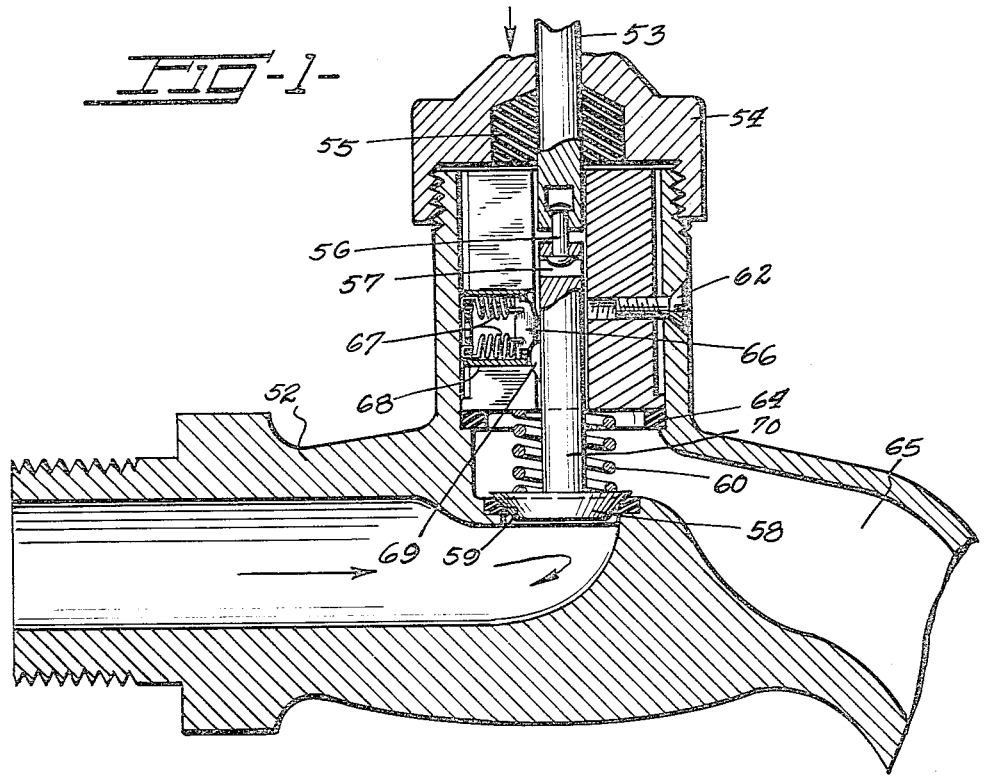
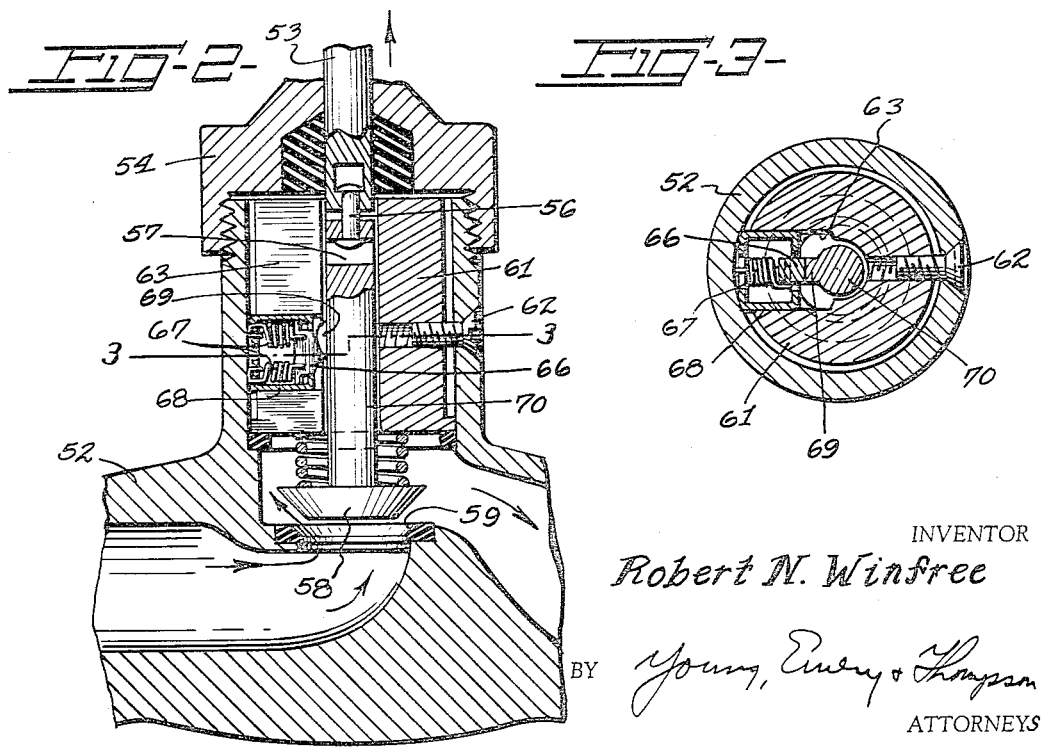
INVENTOR
*Robert N. Winfree*
BY *Young, Emery & Thompson*
ATTORNEYS 2,745,627
Patented May 15, 1956

2,745,627

MANUAL AND AUTOMATIC VALVES

Robert N. Winfree, Lynchburg, Va., assignor to Kel-Win Manufacturing Company, Inc., Richmond, Va., a corporation of Virginia Original application May 31, 1950, Serial No. 165,284, now Patent No. 2,658,716, dated November 16, 1953. Divided and this application July 1, 1953, Serial No. 365,487

3 Claims. (Cl. 251—75)

This invention relates to a valve of the type which is applicable for all water and other distribution systems both large and small. This application is a division of application Serial No. 165,284, filed May 31, 1950, now Patent No. 2,658,716 granted November 16, 1953.

It is an object of this invention to provide a valve with means to cause automatic and quick closing of the valve at a point just before the final seating of the valve spindle or disk on the seat.

A further object of the invention is to provide a valve with mechanism to prevent dripping of the valve due to slow closing or closing with too light a force for complete closure.

Another object of the invention resides in the provision of a mechanism which will positively open and close the valve with the final last degree of closure taking place automatically as a quick final closure with manual effort.

A still further object of the invention resides in the provision of a valve mechanism which will prevent wear on the washer on the valve seat in that the washer is prevented from rotating so that the life of the washer is greatly prolonged, and also lack of wear will prevent loss of water due to a dripping valve or faucet when in the closed position.

Another object of the invention resides in the provision of a valve having positive means to open the valve with manual closing of the valve, but, however, final positive closing of the valve to prevent water from dripping from the valve is accomplished by spring force.

Further objects of the invention will be apparent from the following description when considered in connection with the accompanying drawings in which;

Fig. 1 is a longitudinal sectional view of the valve,

Fig. 2 is a view similar to Fig. 1 with the parts on an enlarged scale and in another position, and Fig. 3 is a cross-section taken on line 3—3 of Fig. 2.

The valve is provided with a casing 52 with an actuating spindle 53 which projects through a cap 54 and a washer 55. A swivel pin 56 connects with some play a valve stem 57 having a valve disk 58 at the lower end to engage a washer 59. A compression spring 60 bears against the disk 58 at one end and against a plug member 61 at the other end. This plug member 61 is secured in the casing 52 by any suitable means such as a screw 62 and is provided with a slot 63 extending the length thereof. A washer 64 seals the passage 65 against water leakage.

A flexible cam member 66 is secured to a pair of springs 67 and is slidable in a small casing 68, the latter being fixed to and in the slot 63. The cam member 66 is adapted to cooperate with a similar cam member 69 fixed or mounted on the valve spindle 70.

The valve of Figs. 4 to 6 operates in that when the valve is to be opened from the position of Fig. 1 to that of Fig. 2, the valve spindle 53 is turned to raise the latter which will in turn raise the pin 56, stem 70 and disk 58 against the force of the spring 60. When the valve is to be closed, the spindle 53 forces the spindle 70 downward by abutting contact until the cam projection 69 is forced past the projection 66 which takes place when the disk 58 is almost on its seat in the closed position. However, finally the projection 69 will slip past the projection 66 and with it the spindle 70 and disk 58 will move so that the valve will close automatically by spring action utilizing the play or clearance between the parts 53 and 70 by the pin 56, as shown in Fig. 1. In this way the final closing of the valve takes place automatically without manual aid to thereby prevent the valve from dripping when not completely closed by hand manipulation. In the open position of Fig. 2 there is a space between the ends of the parts 53 and 70 since the spring 60 constantly tends to force the disk downward, but when the cams 66 and 69 begin to pass each other on the closing stroke the said ends meet to thereby push the spindle 70 past the spring tension exerted by the springs 67 after which the disk will seat itself irrespective of any further turning of the spigot handle.

From the described and illustrated valve spigot, it will be apparent that the structure is such that the final closing of the valve is accomplished automatically and not by any manual control. It so often happens that valves are not tightly closed which will result in a water drip which is, of course, to be avoided due to waste of water. If on the other hand the valve is closed very tight by manual effort, the washer will soon wear out or be actually torn, which will cause a drip with resultant loss of water. Thus with the structure of the present invention the valve is closed manually to just where it will drip and thereafter automatically the valve is tightly closed. The valve of this invention will thus save on water consumption, and also on washer replacement since there is practically no wear on the washer.

I claim as my invention:

1. A valve for fluid systems comprising a casing, a closure disk and stem in said casing, said disk cooperating with a seat portion in the casing, manual means mounted on the casing including a stem cooperating with the stem of the closure disk for actuating the closure disk by means of its stem to open the valve and to partially close the valve down to where a slight opening still exists between the disk and the seat, a pin interconnecting the stems to permit play relative to said stems in the longitudinal direction, means in the casing and on the first-mentioned valve stem to automatically cause a final free closing of the valve after the manual partial closing operation has been completed, said last-mentioned means including a spring on the first-mentioned stem and a cam on the first-mentioned stem and a second cam resiliently mounted in the casing and both cams cooperating with each other to permit a free final closing of the closure disk aided by the spring and a plug member secured in the casing and having a perforation therethrough through which both stems project and also having a cut-away portion in which the second-mentioned cam is secured.

2. A valve for fluid systems comprising a casing, a closure disk and stem in said casing, said disk cooperating with a seat portion in the casing, manual means mounted on the casing including a stem cooperating with the stem of the closure disk for actuating the closure disk by means of its stem to open the valve and to partially close the valve down to where a slight opening still exists between the disk and the seat, a pin interconnecting the stems to permit play relative to said stems in the longitudinal direction, means in the casing and on the first-mentioned valve stem to automatically cause a final free closing of the valve after the manual partial closing operation has been completed, said last-mentioned means including a spring on the first-mentioned stem and a cam on the first-mentioned stem and a second cam resiliently mounted in the casing and both cams cooperating with each other to permit a free final closing of the closure disk aided by the spring, a plug member secured in the casing and having a perforation therethrough through which both stems project and also having a cut-away portion in which the second-mentioned cam is secured, and a small casing provided in the cut-away portion to accommodate the second-mentioned cam.

3. A valve for fluid systems comprising a casing, a closure disk and stem in said casing, said disk cooperating with a seat portion in the casing, manual means mounted on the casing including a stem cooperating with the stem of the closure disk for actuating the closure disk by means of its stem to open the valve and to partially close the valve down to where a slight opening still exists between the disk and the seat, a pin interconnecting the stems to permit play relative to said stems in the longitudinal direction, means in the casing and on the first-mentioned valve stem to automatically cause a final free closing of the valve after the manual partial closing operation has been completed, said last-mentioned means including a spring on the first-mentioned stem and a cam on the first-mentioned stem and a second cam resiliently mounted in the casing and both cams cooperating with each other to permit a free final closing of the closure disk aided by the spring, a plug member secured in the casing and having a perforation therethrough through which both stems project and also having a cut-away portion in which the second-mentioned cam is secured, and a small casing provided in the cut-away portion to accommodate the second-mentioned cam, and at least one compression spring in the small casing connected at one end to the small casing and the other end to the second-mentioned cam.

References Cited in the file of this patent

UNITED STATES PATENTS

| | | |
|---|---|---|
| 500,645 | West | July 4, 1893 |
| 1,036,012 | Schuermann | Aug. 20, 1912 |
| 1,365,476 | Fuller | Jan. 11, 1921 |
| 1,480,942 | McKee | Jan. 15, 1924 |
| 1,722,412 | Eisenhauer | July 30, 1929 |
| 2,267,902 | Eddins | Dec. 30, 1941 |
| 2,460,270 | Ashley | Feb. 1, 1949 |
| 2,606,450 | Bolling | Aug. 12, 1952 |

FOREIGN PATENTS

| | | |
|---|---|---|
| 43,668 | Germany | July 2, 1888 |